United States Patent
Dunkle

(10) Patent No.: US 7,131,469 B2
(45) Date of Patent: Nov. 7, 2006

(54) OUTDOOR TOOL FUEL CAP

(76) Inventor: Gary L. Dunkle, 201 Wilmore Dr., Connersville, IN (US) 47331

( * ) Notice: Subject to any disclaimer, the term of this patent is extended or adjusted under 35 U.S.C. 154(b) by 0 days.

(21) Appl. No.: 11/275,251

(22) Filed: Dec. 20, 2005

(65) Prior Publication Data

US 2006/0151056 A1     Jul. 13, 2006

Related U.S. Application Data

(60) Provisional application No. 60/642,642, filed on Jan. 10, 2005.

(51) Int. Cl.
*B65B 1/04*     (2006.01)
(52) U.S. Cl. .............................. 141/100; 220/DIG. 33
(58) Field of Classification Search .................... 141/9, 141/100, 104, 349, 350, 98; 220/86.2, DIG. 33
See application file for complete search history.

(56) References Cited

U.S. PATENT DOCUMENTS

| | | |
|---|---|---|
| 4,083,209 A | 4/1978 | Sloan, Jr. |
| 4,135,404 A * | 1/1979 | Butler, Jr. .................... 73/426 |
| 4,280,346 A | 7/1981 | Evans |
| 4,280,347 A | 7/1981 | Evans |
| 4,765,505 A | 8/1988 | Harris |
| 4,913,303 A | 4/1990 | Harris |
| 5,108,001 A | 4/1992 | Harris |
| 5,110,003 A | 5/1992 | MacWilliams |
| 5,449,086 A | 9/1995 | Harris |
| 5,638,975 A | 6/1997 | Harris |
| 5,732,841 A | 3/1998 | Jocic et al. |
| 5,794,806 A | 8/1998 | Harris et al. |
| 5,904,057 A | 5/1999 | Abney, III et al. |
| 5,924,590 A | 7/1999 | Joric et al. |
| 6,076,695 A | 6/2000 | Palvoelgyi et al. |
| 6,079,584 A | 6/2000 | Griffin |
| 6,179,148 B1 | 1/2001 | Harris |
| 6,209,746 B1 | 4/2001 | Gerdes |
| 6,308,852 B1 | 10/2001 | Hagano et al. |
| 6,739,472 B1 | 5/2004 | Newport |
| 6,981,532 B1 * | 1/2006 | Dehn et al. .................. 141/110 |

* cited by examiner

*Primary Examiner*—Steven O. Douglas
(74) *Attorney, Agent, or Firm*—Barnes & Thornburg LLP

(57) ABSTRACT

A filler neck closure includes a closure base, a handle, and an apparatus mount. The closure base is adapted to mate with a fuel tank filler neck to close an opening into a fuel-conducting passageway formed in the fuel tank filler neck. In certain embodiments, a fuel treatment apparatus and/or vent apparatus is coupled to the apparatus mount.

34 Claims, 6 Drawing Sheets

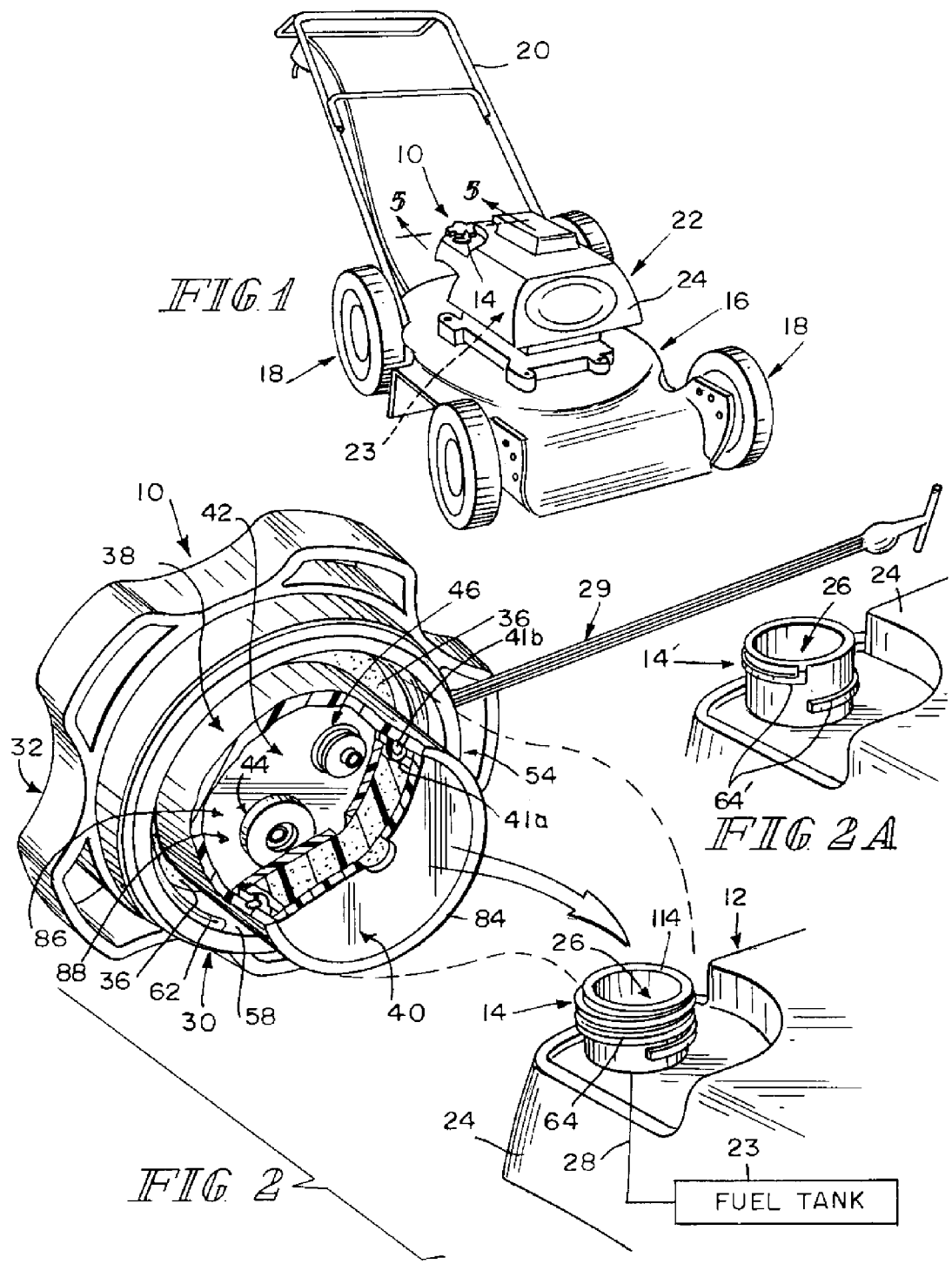

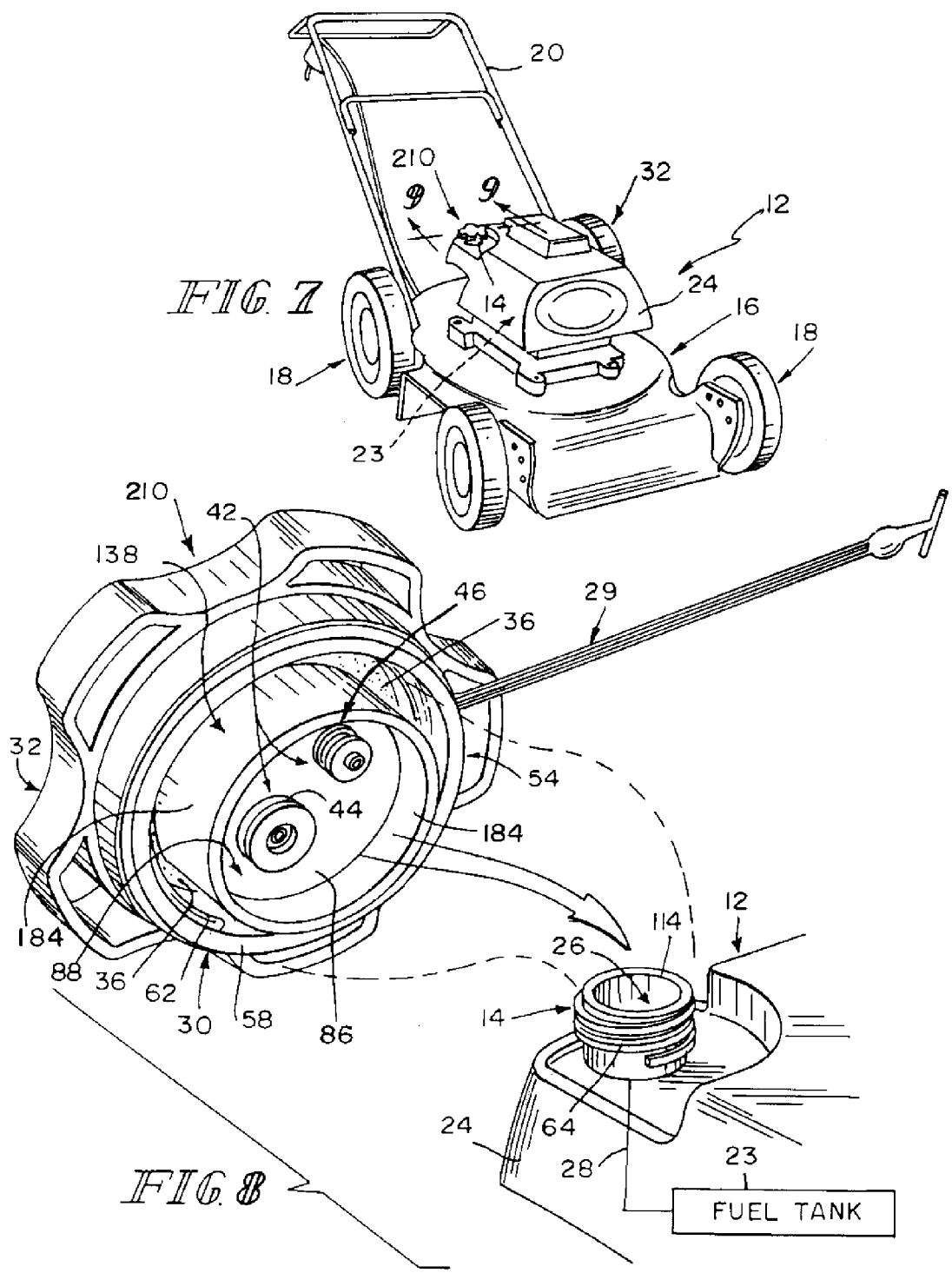

US 7,131,469 B2

OUTDOOR TOOL FUEL CAP

This application claims priority under 35 U.S.C. § 119(e) to U.S. Provisional Application Ser. No. 60/642,642, filed Jan. 10, 2005, which is expressly incorporated by reference herein.

BACKGROUND

The present disclosure relates to fuel caps, and particularly to fuel caps for outdoor tools such as lawn mowers. More particularly, the present disclosure relates to fuel caps including fuel tank venting apparatus.

SUMMARY

A fuel cap comprises a closure base, a handle, and an apparatus mount. In certain embodiments, the fuel cap includes a fuel treatment apparatus coupled to the apparatus mount and/or a vent apparatus coupled to the apparatus mount. The vent apparatus is located between the handle and the fuel treatment apparatus in one illustrative embodiment of the present disclosure.

In an illustrative embodiment, the apparatus mount is coupled to the closure base and arranged to extend into a fuel-conducting passageway in the filler neck leading to the fuel tank. The vent apparatus is coupled to the apparatus mount. The fuel treatment apparatus is coupled to the apparatus mount and configured to dispense fuel preserver into this fuel tank through the fuel-conducting passageway formed in the filler neck. In illustrative embodiments, the vent apparatus is associated with the apparatus mount and configured to regulate flow of air and fuel vapor through the cap and the fuel-conducting passageway formed in the filler neck.

In illustrative embodiments, a torque transmitter is configured to provide a torque-limited driving connection between the handle and the closure base during coupling of the closure base to a fuel tank filler neck to close an opening into that filler neck. The torque transmitter provides a direct-drive driving connection between the handle and the closure base during cap removal.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a lawn mower including a fuel cap made in accordance with the present disclosure and located on filler neck protruding from a shroud covering an engine included in the lawn mower;

FIG. 2 is an enlarged view of a portion of the lawn mower of FIG. 1, with portions broken away, showing a filler neck provided with external threads and a fuel cap coupled to a tether and configured to engage the filler neck to close a mouth opening into a fuel-conducting passageway formed in the filler neck and arranged to lead to a fuel tank onboard the lawn mower;

FIG. 2A is a perspective view similar to FIG. 2 showing a portion of a lawn mower including a filler neck provided with external cap retainer flanges configured to mate with a "quick-on" fuel cap similar to the cap shown in FIG. 2;

FIG. 7 is a perspective view of a lawn mower including a fuel cap in accordance with another embodiment of the present disclosure;

FIG. 8 is an enlarged view of a portion of the lawn mower of FIG. 7 showing a filler neck provided with external threads and a fuel cap including a pressure-relief valve and a vacuum-relief valve, the fuel cap being coupled to a tether and configured to engage the filler neck to close a mouth opening into a fuel-conducting passageway formed in the filler neck and leading to a fuel tank onboard the lawn mower.

DETAILED DESCRIPTION

Figure 3:
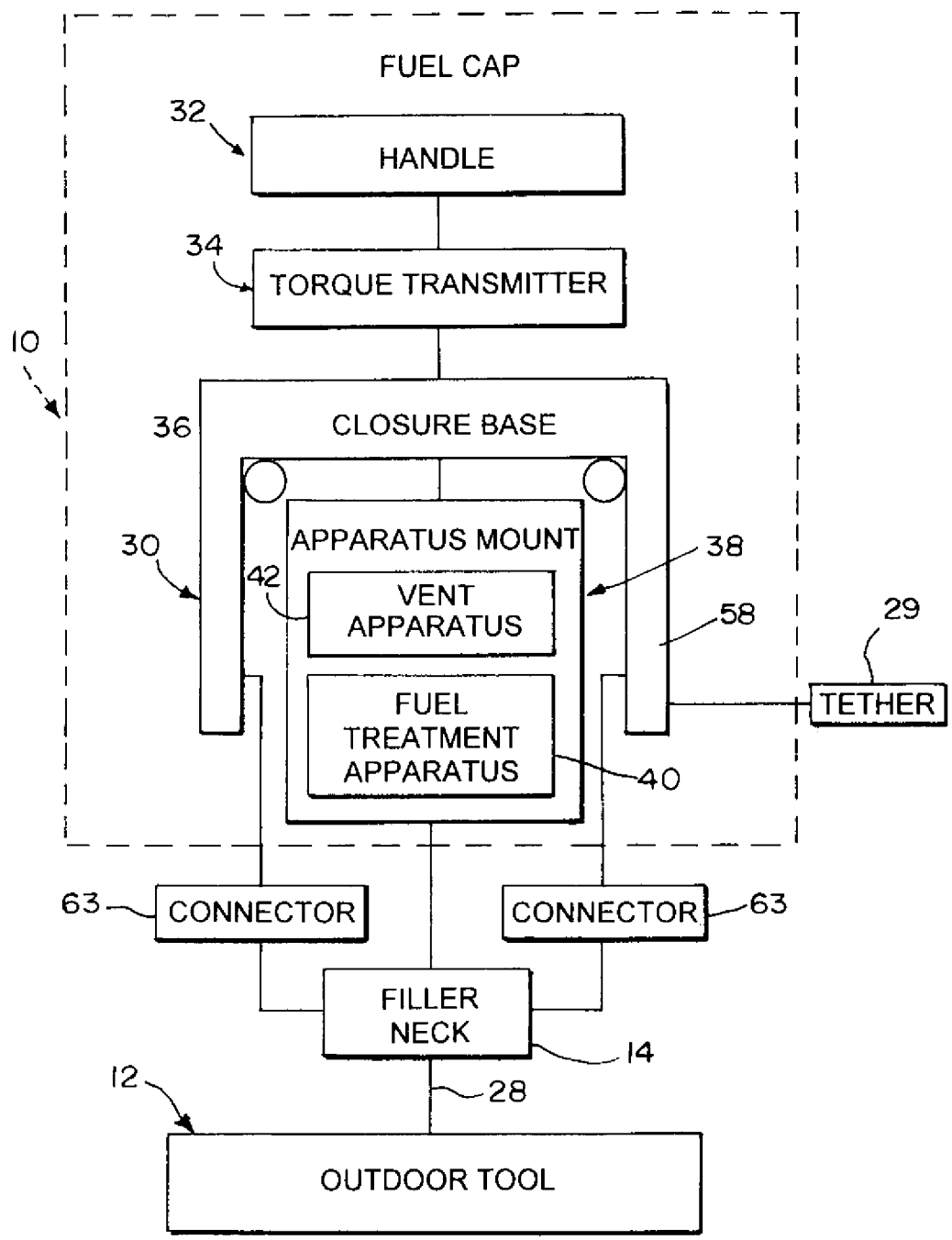
FIG. 3 is a diagrammatic view of a fuel cap in accordance with the present disclosure coupled to a filler neck of an outdoor tool (e.g., a lawn mower) showing vent and fuel treatment apparatus carried on an apparatus mount included in a closure base included in the fuel cap and adapted to be coupled to a filler neck.

A fuel cap 10 providing a filler neck closure is included in a lawn mower 12 as shown in FIG. 1. Fuel cap 10 is configured to mate with a fuel tank filler neck 14 included in lawn mower 12 as suggested in FIG. 2. Fuel cap 10 is also configured to include fuel treatment apparatus 40 for dispensing fuel preserver through filler neck 14 into a fuel tank 23 on board lawn mower 12 to maintain "freshness" of fuel (not shown) stored in that fuel tank 23 as suggested in FIGS. 2 and 5. Fuel cap 10 further includes filler neck vent apparatus 42 (e.g., pressure-relief valve 44, vacuum-relief valve 46, and a perforated partition wall 86) as suggested in FIGS. 2–5, while a fuel cap 10' in accordance with another embodiment of the present disclosure does not include vent apparatus as suggested in FIG. 6.

Lawn mower 12 includes deck 16 supporting and covering blades (not shown), wheels 18 rotatable on axles coupled to deck 16, a push handle 20 coupled to deck 16, and a power source 22 comprising a fuel tank 23 coupled to filler neck 14, an engine (not shown), and a shroud 24 covering the engine and lying above deck 16. It is within the scope of this disclosure to mount fuel cap 10 on a fuel tank filler neck of other implements, yard tools, or outdoor tools.

Fuel cap 10 is configured to engage and mate with filler neck 14 and close a mouth 26 opening into a fuel-conducting passageway 28 formed in filler neck 14 and leading to a fuel tank 23 onboard lawn mower 12 as suggested in FIGS. 1 and 2. A tether 29 is coupled to fuel cap 10 in the illustrated embodiment so that fuel cap 10 is always tethered to lawn mower 12.

Figure 4:
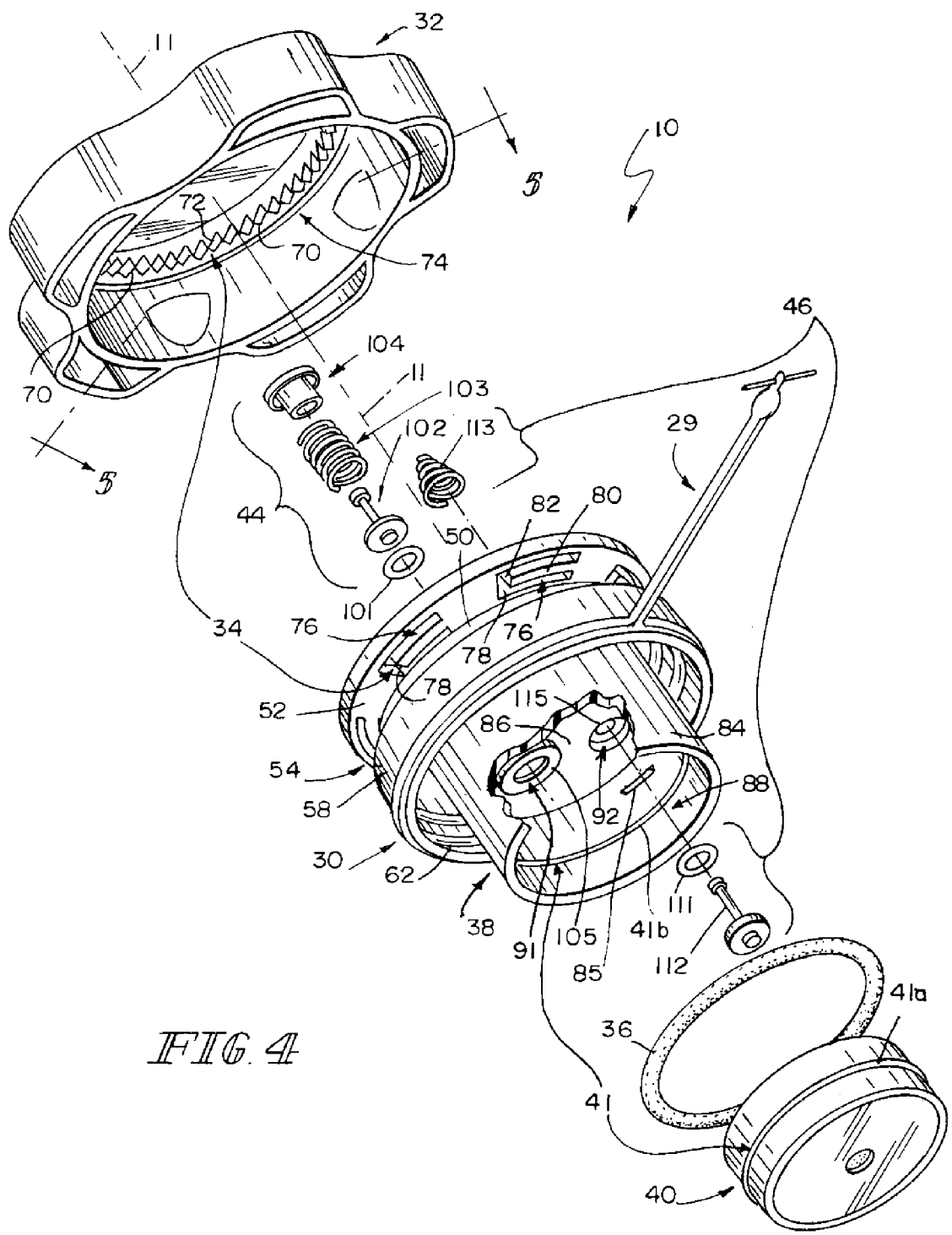
FIG. 4 is an exploded perspective view of the fuel cap shown in FIG. 2 showing in sequence (from left to right) a handle formed to include a series of ratchet teeth arranged in a ring-shaped pattern and formed on an underside of the handle, a first collection of components that can be assembled to define a pressure-relief valve included in the vent apparatus, a closure base formed to include a series of circumferentially spaced-apart flexible ratchet members cantilevered to an annular platform in the closure base and arranged to mate with the ratchet teeth on the handle to define a torque transmitter between the handle and the closure base, a central apparatus mount coupled to the closure base, a second collection of components that can be assembled to define a vacuum-relief valve included in the vent apparatus, an O-ring seal, and a fuel-treatment apparatus adapted to fit into the central apparatus mount coupled to the closure base.

As suggested in FIGS. 3 and 4, fuel cap 10 includes a closure base 30 coupled to tether 29 and adapted to mate with filler neck 14, a handle 32 located above closure base 30, and a torque transmitter 34 arranged to interconnect closure base 30 and handle 32. Fuel cap 10 also includes an O-ring seal 36 arranged to establish a sealed connection between closure base 30 and filler neck 14 once fuel cap 10 is coupled to filler neck 14 as suggested, for example, in FIG. 5.

Fuel cap 10 also includes an apparatus mount 38 coupled to closure base 30. Fuel treatment apparatus 40 is retained on apparatus mount 38 as suggested, for example, in FIGS. 3 and 4. One illustrative example of fuel treatment apparatus 40 is the FRESH START™ continuous fuel preserver cartridge available from Briggs & Stratton. Vent apparatus 42 is also provided in fuel cap 10 as suggested in FIGS. 2 and 3. In the embodiment illustrated in FIGS. 1–5, vent apparatus 42 includes a partition wall 86 and valve apparatus mating with partition wall 86 and comprising a pressure-relief valve 44 and a vacuum-relief valve 46. Fuel treatment apparatus 40 and vent apparatus 42 are included in a fluid management system provided in fuel cap 10. Vent apparatus 42 is coupled to apparatus mount 38 and interposed between handle 32 and fuel treatment apparatus 40 as suggested, for example, in FIGS. 2 and 3.

Figure 5:
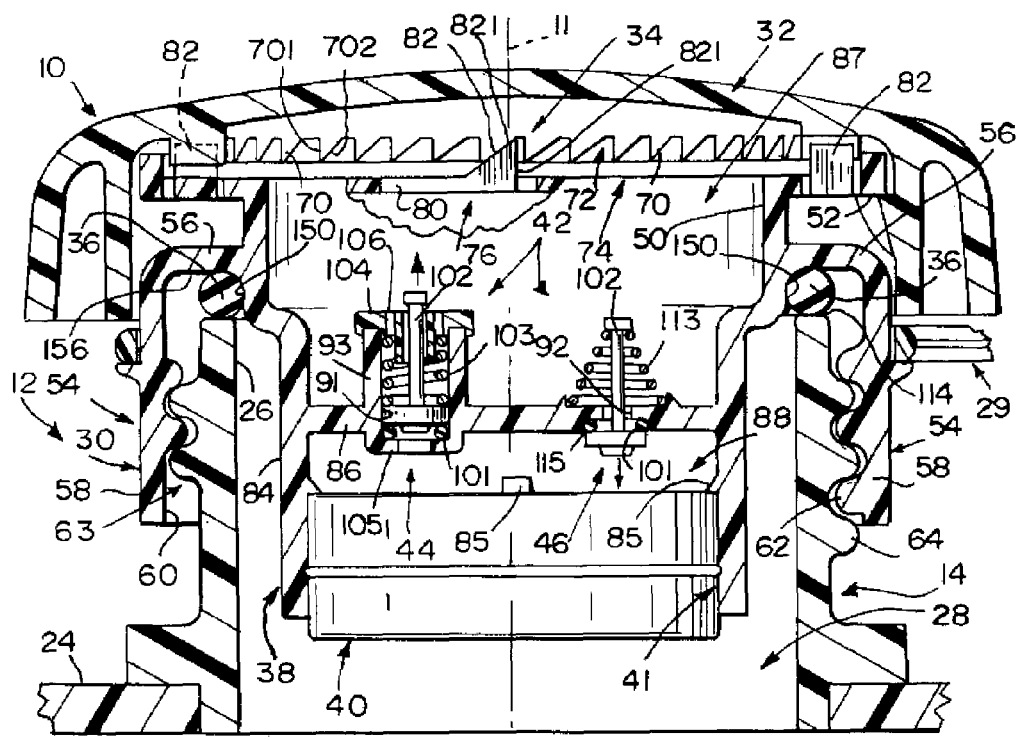
FIG. 5 is a sectional view taken along lines 5—5 of FIGS. 1 and 4 showing the closure base of the fuel cap coupled to the filler neck and showing vent apparatus (e.g., pressure-relief and vacuum-relief valves on a partition wall) and fuel-treatment apparatus coupled to the central apparatus mount depending from the closure base and extending into the fuel-conducting passageway formed in the filler neck.

Closure base 30 includes an upright tube 50, an annular platform 52 coupled to and arranged to extend radially outwardly from an upper end of upright tube 50, and an annular skirt 54 coupled to and arranged to extend radially outwardly from a middle portion of upright tube 50 as shown best in FIG. 5. Annular skirt 54 includes an annular proximal portion 56 arranged to underlie annular platform 52 and a tubular distal portion 58 arranged to extend axially downwardly from a perimeter portion of annular proximal portion 56 as also shown in FIG. 5. In the illustrated embodiment, tether 29 is coupled to tubular distal portion 50.

In the illustrated embodiment, an inner wall 60 of tubular distal portion 58 is arranged to surround an outer end of filler neck 14 and to mate with filler neck 14. In the embodiment illustrated in FIGS. 2 and 5, internal threads 62 are formed on inner wall 60 and configured to mate with external threads 64 provide on an exposed exterior surface of filler neck 14. Threads 62 and 64 cooperate to provide a connector 63 as suggested diagrammatically in FIG. 3. In an alternative embodiment, shown in part in FIG. 2A, "quick-on" connector means is provided on a fuel cap (not shown) for mating with cap-retainer flanges 64' formed on an exposed exterior surface of filler neck 14'. Reference is hereby made to U.S. Pat. Nos. 6,739,472; 6,079,584; and 5,924,590, the disclosures of which are incorporated by reference herein, for descriptions of suitable quick-on connector means.

Torque transmitter 34 is configured to provide a temporary torque-limited driving connection between handle 32 and closure base 30. Torque transmitter 34 transmits torque from handle 32 to annular platform 52 of closure base 30 to cause closure base 30 to turn on filler neck 14 during cap installation (in response to rotation of handle 32 in a clockwise, cap-advancing direction about a vertical axis 11) until closure base 30 is mated with filler neck 14 and the torque applied by torque transmitter 34 begins to exceed a predetermined or preset torque limit. Once the preset torque limit is exceeded, torque transmitter 34 produces an audible and/or tactile and/or other receivable signal to a user so that the user will know not to turn cap 10 further in the clockwise, cap-advancing direction on filler neck 14, which could lead to "over-tightening" cap 10 on filler neck 14.

Torque transmitter 34 operates to signal over-tightening of closure base 30 on filler neck 14 to a user during cap installation on a filer neck, which over-tightening could lead to damage of O-ring seal 36 positioned to lie between closure base 30 and filler neck 14. As suggested in FIG. 5, O-ring seal 36 is positioned to lie between a downwardly facing annular surface 156 on annular proximal portion 56, an outwardly facing annular surface 150 on a lower end of upright tube 50, and an axially upwardly facing annular surface 114 on filler neck 14 so as to establish a sealed connection between closure base 30 and filler neck 14 when cap 10 is rotated about axis 11 to assume an installed position with respect to filler neck 14.

In an illustrative embodiment, torque transmitter 34 comprises a first set of components 70 (e.g. ratchet teeth) and notches 72 provided on an axially inwardly facing underside 74 of handle 32 and a second set of ratchet components 76 and slots 78 provided on annular platform 52 of closure base 30 as shown, for example, in FIGS. 4 and 5. As shown and described herein, these two sets of components interact with one another to generate a torque-limit signal during cap installation to alert a user to cease rotating handle 32 in a clockwise, cap-advancing direction once closure base 30 has been mated with filler neck 14 and tightened properly.

As suggested in FIGS. 4 and 5, six spaced-apart ratchet components 76 are provided and each ratchet component 76 comprises a flexible spring arm 80 cantilevered to annular platform 52 and a spring head 82 on a free end of spring arm 80. Each spring arm 80 extends in a slot 78 formed in annular platform 52 and carries spring head 82 up and down as the spring arm flexes, bends, or deflects during cap installation and removal. Spring head 82 is biased yieldably by spring arm 80 to fit into notches 72 provided between pairs of adjacent ratchet teeth 70 on underside 74 of handle 32.

Each ratchet tooth 70 includes a vertical drive surface 701 and an inclined drive surface 702 as suggested in FIG. 5. Likewise, each spring head 82 includes a vertical driven surface 821 and an inclined driven surface 822 as also suggested in FIG. 5.

During cap removal, vertical drive surfaces 701 of certain ratchet teeth 70 mate with a vertical driven surface 821 of each spring head 82 to establish a "direct-drive" connection between handle 32 and closure base 30. In contrast, during cap installation, inclined drive surfaces 702 on certain teeth 70 mate with inclined driven surfaces 822 on each spring head 82 to establish a "torque-limited" connection between handle 32 and closure base 30. If the torque applied to handle 32 by a user (during cap installation) exceeds a preset torque limit, then the inclined drive surfaces 702 on teeth 70 will slip on the inclined driven surfaces 822 on each spring head. A repeated "clicking noise" is heard and a series of "clicking bumps" are felt by a user whenever the torque-limited driving connection is broken during cap installation and handle 32 (gripped by the user) begins to rotate freely with respect to closure base 30, thus absorbing "excess torque" and thereby protecting O-ring seal 36 from unnecessary abrasion.

In an illustrative embodiment, apparatus mount 38 includes a tubular sleeve 84 having an upper end coupled to a lower end of upright tube 50 of closure base 30 as shown best in FIG. 5. When cap 10 is mounted on filler neck 14 as shown in FIG. 5, an upper portion of filler neck 14 lies in an annular space located between tubular distal portion 58 of closure base 30 and tubular sleeve 84 of apparatus mount 38. Apparatus mount 38 also includes radially inwardly extending flanges 85 appended to an inner surface of tubular sleeve 84 as shown in FIG. 5.

Figure 6:
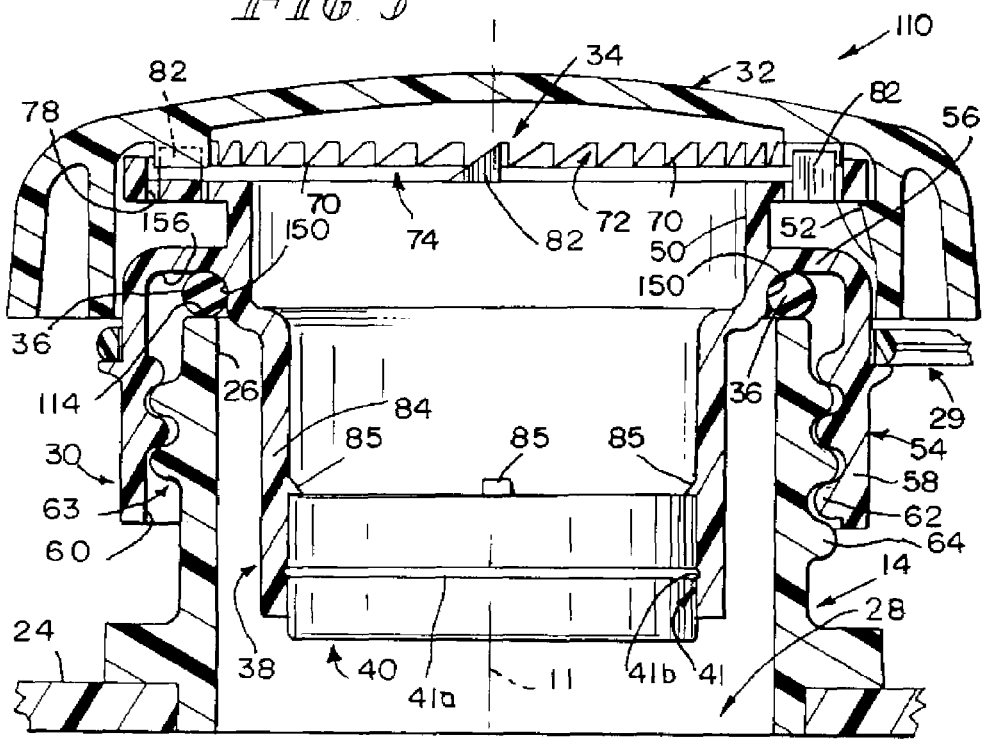
FIG. 6 is a sectional view similar to FIG. 5 showing a fuel cap without vent apparatus in accordance with another embodiment of the present disclosure.

Apparatus mount 38 is configured to receive and retain fuel treatment apparatus 40 as suggested in FIGS. 4–6. In an illustrative embodiment, fuel treatment apparatus 40 is a container filled with a fuel preserver and formed to include means for slowly dispensing the fuel preserver into fuel-conducting passageway 28 to reach liquid fuel in fuel tank 23. Means 41 is provided for releasably retaining fuel treatment apparatus 40 in a compartment formed in tubular sleeve 84 as suggested in FIGS. 4 and 5. In the illustrated embodiment, ring 41b formed on an inner surface of tubular sleeve 84 "snaps" into a groove 41a formed on an outer surface of apparatus 40 to retain fuel treatment apparatus 40 in the compartment formed in tubular sleeve 84. Radially inwardly extending flanges 85 are appended to the cylindrical inner surface of tubular sleeve 84 as suggested in FIGS. 4 and 5 to limit inward movement of fuel treatment apparatus 40 into the compartment formed in tubular sleeve 84.

Filler neck vent apparatus 42 also includes a partition wall 86 coupled to tubular sleeve 84 and located above flanges 85 as shown, for example, in FIG. 5. In an illustrative embodiment, tubular sleeve 84, partition wall 86, and closure base 30 cooperate to form a monolithic element made of a plastics material. Partition wall 86 is arranged to divide an interior region of tubular sleeve 84 into an upper region or vent chamber 87 between partition wall 86 and handle 32 and a lower region 88 below partition wall 86. Lower region 88 provides a fuel treatment apparatus compartment and partition wall 86 defines a "ceiling" of the fuel treatment apparatus compartment. In the illustrative embodiment, valve apparatus 44,46 is coupled to partition wall 86 and configured to regulate flow of air and fuel vapor between upper and lower regions 87, 88 through apertures 91,92 formed in partition wall 86 as suggested, for example, in FIG. 5.

Pressure-relief valve 44 is included in vent apparatus 42 in an illustrative embodiment. Pressure-relief valve 44 is mounted in a pressure-relief aperture 91 formed in partition wall 86 as suggested in FIGS. 4 and 5.

Pressure-relief valve 44 comprises a seal ring 101, a valve stem 102, a pressure spring 103, and a retainer cap 104. When assembled as suggested in FIG. 5, and installed in a vent sleeve 93 forming pressure-relief aperture 91 and a vent passageway 191, pressure spring 103 urges valve stem 102 and seal ring 101 normally against a valve seat 105 to close pressure-relief aperture 91. Whenever pressure extant in compartment 88 exceeds a preset limit, pressurized fuel vapor will act against valve stem 102 to move valve stem 102 against a downward biasing force applied by pressure spring 103 to open pressure-relief aperture 91 and allow pressurized fuel vapor in fuel tank 23 to vent to the atmosphere through pressure-discharge passageways 106 formed in retainer cap 104.

Vacuum-relief valve 46 is included in vent apparatus 42 in an illustrative embodiment. Vacuum-relief valve 46 is mounted in vacuum-relief aperture 92 formed in partition wall 86 as suggested in FIGS. 4 and 5.

Vacuum-relief valve 46 comprises a seal ring 111, a valve stem 112, and a vacuum spring 113. When assembled as suggested in FIG. 5, and installed in vacuum-relief aperture 92, vacuum spring 113 urges valve stem 112 and seal ring 111 normally against a valve seat 115 to close vacuum-relief aperture 92. Whenever a vacuum extant in compartment 88 exceeds a preset limit, atmospheric air will flow into compartment 88, fuel-conducting passageway 218 of filler neck 14, and fuel tank 23 through opened vacuum-relief aperture 92 to "relieve" any unwanted vacuum extant in fuel tank 23.

A fuel cap 10 in accordance with another embodiment of the present disclosure is illustrated in FIG. 6. A fuel cap 210 in accordance with yet another embodiment of the present disclosure is illustrated in FIGS. 7–9.

Figure 9:
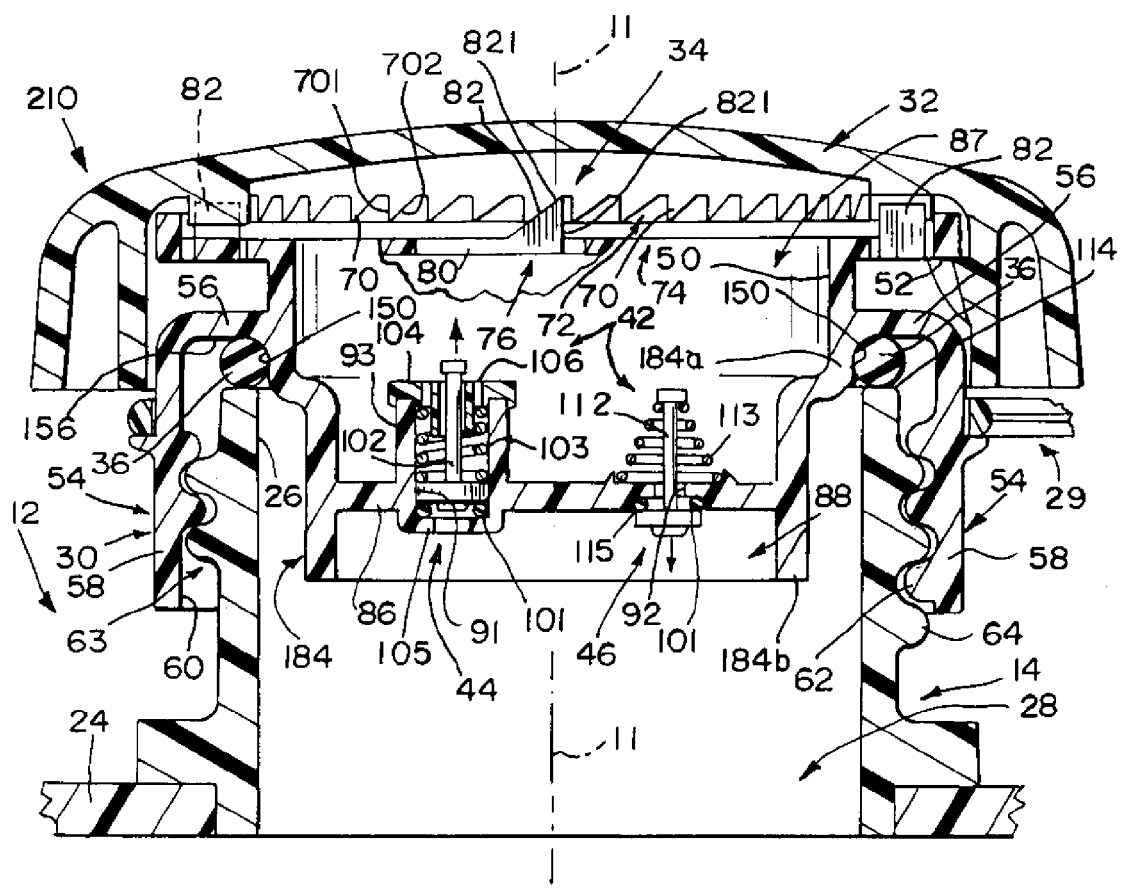
FIG. 9 is a sectional view taken along line 9—9 of FIG. 7 showing a closure base included in the fuel cap and vent apparatus (e.g., pressure-relief and vacuum-relief valves) on a partition wall coupled to the close base.

As suggested in FIGS. 8 and 9, apparatus mount 138 is coupled to closure base 30 and arranged to extend into an interior region formed in closure base 30. In an illustrative embodiment, apparatus mount 138 is defined by a tubular sleeve 184. Tubular sleeve 184 has a first portion 184a coupled to closure base 30 and a second portion 184b extending downwardly from first portion 184a as shown, for example, in FIG. 9.

In an illustrative embodiment, filler neck vent apparatus 42 includes a partition wall 86 coupled to second portion 184g of tubular sleeve 184, a pressure-relief valve 44, and a vacuum-relief valve 46. Pressure-relief valve 44 provides means for venting pressurized fuel vapor extant in fuel-conducting passage 28 formed in fuel tank filler neck 14 to vent chamber 87 for discharge into the atmosphere. Vacuum-relief valve 46 provides means for admitting atmospheric air extant in vent chamber 87 into fuel-conducting passageway 28 formed in fuel tank filler neck 14 whenever a vacuum extant in fuel tank filler neck 14 exceeds a preset limit to relieve any unwanted vacuum in fuel tank 23.

The invention claimed is:

1. A filler neck closure comprising
a fuel cap including a handle and a closure base arranged to underlie the handle and adapted to mate with a fuel tank filler neck to close an opening into a fuel-conducting passageway formed in the filler neck,
an apparatus mount coupled to the closure base and arranged to extend into an interior region formed in the closure base, and
a fluid management system including a fuel treatment apparatus coupled to the apparatus mount and configured to dispense fuel preserver into the fuel-conducting passageway formed in the filler neck to mix with fuel extant in a fuel tank coupled to the fuel tank filler neck and filler neck vent apparatus coupled to the apparatus mount and interposed between the handle and the fuel treatment apparatus.

2. The filler neck closure of claim 1, wherein the closure base includes an annular skirt having an inner wall configured to define a boundary of the interior region formed in the closure base and retainer means for mating with a fuel tank filler neck to retain the fuel cap in place on the fuel tank filer neck and wherein the retainer means is located on the inner wall of the annular skirt and arranged to surround a portion of the apparatus mount.

3. The filler neck closure of claim 2, wherein the closure base further includes an upright tube having an upper end located in close proximity to the handle, a lower end coupled to the apparatus mount, and a middle portion located between the upper and lower ends, and the annular skirt is coupled to the middle portion of the upright tube.

4. The filler neck closure of claim 3, wherein the annular skirt includes a radially outwardly extending proximal portion coupled to the middle portion of the upright tube and a tubular distal portion arranged to extend downwardly from a perimeter portion of the radially outwardly extending proximal portion and formed to include the inner wall on which the retainer means is located.

5. The filler neck closure of claim 3, wherein the closure further includes a radially outwardly extending annular platform coupled to the upper end of the upright tube and arranged to face toward a top wall of the handle and further comprising torque transmitter means on the top wall and the annular platform for providing a torque-limited driving connection between the top wall of the handle and the annular platform of the closure base to cause the closure base to turn on a filler neck during fuel cap installation in response to rotation of the handle in a clockwise, cap-advancing direction about an axis of rotation until the closure base is mated with the filler neck and torque transmitted by the torque transmitter means begins to exceed a predetermined torque limit.

6. The filler neck closure of claim 2, wherein the annular skirt includes a radially outwardly extending proximal portion, the closure base further includes a radially outwardly extending annular platform positioned to lie in spaced-apart relation to the radially outwardly extending proximal portion of the annular skirt and interposed between a top wall of the handle and the radially outwardly extending proximal portion of the annular skirt, and further comprising an O-ring seal coupled to the closure base and arranged to cause the radially outwardly extending proximal portion of the annular skirt to lie between the O-ring seal and the radially outwardly extending annular platform.

7. The filler neck closure of claim 6, further comprising torque transmitter means on the handle and the annular platform for providing a torque-limited driving connection between the handle and the annular platform to cause the closure base to turn on a filler neck during fuel cap installation in response to rotation of the handle in a clockwise, cap-advancing direction about an axis of rotation until the closure base is mated with the filler neck and torque transmittal by the torque transmitter means begins to exceed a predetermined torque limit.

8. The filler neck closure of claim 1, wherein the apparatus mount includes a tubular sleeve having an upper end coupled to the closure base, a lower end coupled to the fuel treatment apparatus, and a middle portion between the upper and lower ends of the tubular sleeve, and the filler neck vent apparatus is coupled to the middle portion of the tubular sleeve.

9. The filler neck closure of claim 8, wherein the filler neck vent apparatus includes a partition wall coupled to the middle portion of the tubular sleeve and arranged to lie in an interior region formed in the tubular sleeve and a pressure-relief valve mounted in a pressure-relief aperture formed in the partition wall and configured to provide means for venting pressurized fuel vapor extant in a compartment provided in the interior region of the tubular sleeve between the partition wall and the fuel treatment apparatus to a vent chamber opened to the atmosphere and located between the partition wall and the handle whenever pressure of fuel vapor extant in the compartment exceeds a preset limit.

10. The filler neck closure of claim 9, wherein the partition wall is made of a monolithic plastics material and includes a plate coupled to the middle portion of the tubular sleeve and an elongated vent sleeve appended to the plate and formed to define the pressure-relief aperture and a vent passageway communicating with the pressure-relief aperture and wherein the pressure-relief valve includes a retainer cap formed to include at least one pressure-discharge passageway and coupled to one end of the vent sleeve, a valve stem arranged to move back and forth in the pressure-relief channel relative to the retainer cap, a seal ring arranged to lie in the pressure-relief channel against an annular valve seat included in another end of the vent sleeve and formed to define the pressure-relief aperture, and a pressure spring located in the vent passageway and arranged normally to apply a biasing force to urge the valve stem against the seal ring on the annular valve seat to close the pressure-relief aperture and yield upon exposure of the valve stem to pressure of fuel vapor in the compartment in excess of a preset limit to allow pressurized fuel vapor in the compartment to vent to the atmosphere through each pressure-discharge passageway formed in the retainer cap.

11. The filler neck closure of claim 9, wherein the filler neck vent apparatus further includes a vacuum-relief valve mounted in a vacuum-relief aperture formed in the partition wall and configured to provide means for admitting atmospheric air extant in the vent chamber located between the partition wall and the handle into the compartment provided in the interior region of the tubular sleeve between the partition wall and the fuel treatment apparatus whenever a vacuum extant in the compartment exceeds a preset limit to relieve any unwanted vacuum extant in the compartment and in a fuel tank filler neck in fluid communication with the compartment.

12. The filler neck closure of claim 11, wherein the vacuum-relief valve includes a seal ring, a valve stem, and a vacuum spring configured to urge the valve stem relative to the partition wall normally against a valve seat provided on the partition wall to close the vacuum-relief aperture until a vacuum extant in the compartment exceeds the preset limit.

13. The filler neck closure of claim 1, wherein the filler neck vent apparatus includes a partition wall coupled to the apparatus mount to form a vent chamber opened to the atmosphere and located between the handle and the partition wall and to form a compartment located between the partition wall and the fuel treatment apparatus and opened to a fuel-conducting passageway formed in a fuel tank filler neck upon mating of the closure base to the fuel tank filler neck and the filler neck vent apparatus further includes a pressure-relief valve mounted in a pressure-relief aperture formed in the partition wall and configured to provide means for venting pressurized fuel vapor extant in the compartment into the vent chamber whenever pressure extant in the compartment exceeds a preset limit.

14. The filler neck closure of claim 13, wherein the apparatus mount includes a tubular sleeve having an upper end coupled to the closure base and formed to define a boundary of the vent chamber and a lower end coupled to the fuel treatment apparatus and wherein the tubular sleeve, partition wall, and closure base cooperate to form a monolithic element made of a plastics material.

15. The filler neck closure of claim 14, wherein the partition wall includes a plate coupled to a middle portion of the tubular sleeve arranged to interconnect the upper and lower portions of the tubular sleeve and an elongated vent sleeve appended to the plate and formed to define the pressure-relief aperture and a vent passageway communicating with the pressure-relief aperture and a portion of the pressure-relief means is located in the vent passageway.

16. The filler neck closure of claim 1, wherein the filler neck vent apparatus includes a partition wall coupled to the apparatus mount to form a vent chamber opened to the atmosphere and located between the handle and the partition wall and to form a compartment located between the partition wall and the fuel treatment apparatus and opened to a fuel-conducting passageway formed in a fuel tank filler neck upon mating of the closure base to the fuel tank filler neck and the filler neck vent apparatus further includes a vacuum-relief valve mounted in a vacuum-relief aperture formed in the partition wall and configured to provide means for admitting atmospheric air extant in the vent chamber into the compartment whenever a vacuum extant in the compartment exceeds a preset limit to relieve any unwanted vacuum extant in the compartment and in a fuel tank filler neck in fluid communication with the compartment.

17. The filler neck closure of claim 16, wherein the apparatus mount includes a tubular sleeve having an upper end coupled to the closure base and formed to define a boundary of the vent chamber and a lower end coupled to the fuel treatment apparatus and wherein the tubular sleeve, partition wall, and closure base cooperate to form a monolithic element made of a plastics material.

18. The filler neck closure of claim 16, wherein the filler neck vent apparatus further includes a pressure-relief valve mounted in a pressure-relief aperture formed in the partition wall and configured to provide means for venting pressurized fuel vapor extant in the compartment into the vent chamber whenever pressure extant in the compartment exceeds a preset limit.

19. A filler neck closure comprising
a closure base adapted to mate with a filler neck,
a handle located above the closure base,
a torque transmitter arranged to interconnect the closure base and the handle and configured to provide a temporary torque-limited driving connection between the closure base and the handle,
a tubular sleeve coupled to the closure base and formed to include an interior region,
a partition wall arranged to divide the interior region of the tubular sleeve into an upper region between the partition wall and the handle and a lower region below the partition wall,
a fuel treatment apparatus coupled to the tubular sleeve to locate the partition wall between the handle and the fuel treatment apparatus, and
valve apparatus coupled to the partition wall and configured to regulate flow of air and fuel vapor between the upper and lower regions formed in the tubular sleeve.

20. The filler neck closure of claim 19, wherein the closure base includes an upright tube, an annular platform coupled to and arranged to extend radially outwardly from an upper end of the upright tube, and an annular skirt including an annular proximal portion coupled to and arranged to extend radially outwardly from a middle portion of the upright tube and a tubular distal portion arranged to extend axially downwardly from a perimeter portion of the annular proximal portion and wherein the annular platform is coupled to the torque transmitter and is arranged to lie between the handle and the annular proximal portion.

21. A filler neck closure comprising
a closure base adapted to mate with a filler neck,
a handle located above the closure base,
a tubular sleeve coupled to the closure base and formed to include an interior region,
a partition wall arranged to divide the interior region of the tubular sleeve into an upper region between the partition wall and the handle and a lower region below the partition wall,
a fuel treatment apparatus coupled to the tubular sleeve to locate the partition wall between the handle and the fuel treatment apparatus,
a pressure-relief valve mounted in a pressure-relief aperture formed in the partition wall, and
a vacuum-relief valve mounted in a vacuum-relief aperture formed in the partition wall.

22. A filler neck closure comprising
a fuel cap including a handle and a closure base arranged to underlie the handle and adapted to mate with a fuel tank filler neck to close an opening into a fuel-conducting passageway formed in the filler neck,
an apparatus mount coupled to the closure base and arranged to extend into an interior region formed in the closure base, and
a fluid management system including a filler neck vent apparatus coupled to the apparatus mount, wherein the closure base includes an annular skirt having an inner wall configured to define a boundary of the interior region formed in the closure base and retainer means for mating with a fuel tank filler neck to retain the fuel cap in place on the fuel tank filer neck and wherein the retainer means is located on the inner wall of the annular skirt and arranged to surround a portion of the apparatus mount.

23. The filler neck closure of claim 22, wherein the closure base further includes an upright tube having an upper end located in close proximity to the handle, a lower end coupled to the apparatus mount, and a middle portion located between the upper and lower ends, and the annular skirt is coupled to the middle portion of the upright tube.

24. The filler neck closure of claim 23, wherein the annular skirt includes a radially outwardly extending proximal portion coupled to the middle portion of the upright tube and a tubular distal portion arranged to extend downwardly from a perimeter portion of the radially outwardly extending proximal portion and formed to include the inner wall on which the retainer means is located.

25. The filler neck closure of claim 23, wherein the closure further includes a radially outwardly extending annular platform coupled to the upper end of the upright tube and arranged to face toward a top wall of the handle and further comprising torque transmitter means on the top wall and the annular platform for providing a torque-limited driving connection between the top wall of the handle and the annular platform of the closure base to cause the closure base to turn on a filler neck during fuel cap installation in response to rotation of the handle in a clockwise, cap-advancing direction about an axis of rotation until the closure base is mated with the filler neck and torque transmitted by the torque transmitter means begins to exceed a predetermined torque limit.

26. The filler neck closure of claim 23, wherein the annular skirt includes a radially outwardly extending proximal portion, the closure base further includes a radially outwardly extending annular platform positioned to lie in spaced-apart relation to the radially outwardly extending proximal portion of the annular skirt and interposed between a top wall of the handle and the radially outwardly extending proximal portion of the annular skirt, and further comprising an O-ring seal coupled to the closure base and arranged to cause the radially outwardly extending proximal portion of the annular skirt to lie between the O-ring seal and the radially outwardly extending annular platform.

27. The filler neck closure of claim 26, further comprising torque transmitter means on the handle and the annular platform for providing a torque-limited driving connection between the handle and the annular platform to cause the closure base to turn on a filler neck during fuel cap installation in response to rotation of the handle in a clockwise, cap-advancing direction about an axis of rotation until the closure base is mated with the filler neck and torque transmittal by the torque transmitter means begins to exceed a predetermined torque limit.

28. The filler neck closure of claim 22, wherein the apparatus mount is a tubular sleeve having a first portion coupled to the closure base and a second portion extending downwardly from the first portion and the filler neck vent apparatus is coupled to the second portion of the tubular sleeve.

29. The filler neck closure of claim 28, wherein the filler neck vent apparatus includes a partition wall coupled to the second portion of the tubular sleeve and arranged to lie in an interior region formed in the tubular sleeve and a pressure-relief valve mounted in a pressure-relief aperture formed in the partition wall and configured to provide means for venting pressurized fuel vapor extant in a filler neck receiving the tubular sleeve to a vent chamber opened to the atmosphere and located between the partition wall and the handle whenever pressure of fuel vapor extant in the fuel tank filler neck exceeds a preset limit.

30. The filler neck closure of claim 29, wherein the partition wall is made of a monolithic plastics material and includes a plate coupled to the second portion of the tubular sleeve and an elongated vent sleeve appended to the plate and formed to define the pressure-relief aperture and a vent passageway communicating with the pressure-relief aperture and wherein the pressure-relief valve includes a retainer cap formed to include at least one pressure-discharge passageway and coupled to one end of the vent sleeve, a valve stem arranged to move back and forth in the pressure-relief channel relative to the retainer cap, a seal ring arranged to lie in the pressure-relief channel against an annular valve seat included in another end of the vent sleeve and formed to define the pressure-relief aperture, and a pressure spring located in the vent passageway and arranged normally to apply a biasing force to urge the valve stem against the seal ring on the annular valve seat to close the pressure-relief aperture and yield upon exposure of the valve stem to pressure of fuel vapor in the compartment in excess of a preset limit to allow pressurized fuel vapor in the filler neck to vent to the atmosphere through each pressure-discharge passageway formed in the retainer cap.

31. The filler neck closure of claim 29, wherein the filler neck vent apparatus further includes a vacuum-relief valve mounted in a vacuum-relief aperture formed in the partition wall and configured to provide means for admitting atmospheric air extant in the vent chamber located between the partition wall and the handle into the fuel tank filler neck whenever a vacuum extant in the fuel tank filler neck exceeds a preset limit to relieve any unwanted vacuum extant in the fuel tank filler neck.

32. The filler neck closure of claim 31, wherein the vacuum-relief valve includes a seal ring, a valve stem, and a vacuum spring configured to urge the valve stem relative to the partition wall normally against a valve seat provided on the partition wall to close the vacuum-relief aperture until a vacuum extant in the fuel tank filler neck exceeds the preset limit.

33. The filler neck closure of claim 28, wherein the filler neck vent apparatus further includes a vacuum-relief valve mounted in a vacuum-relief aperture formed in the partition wall and configured to provide means for admitting atmospheric air extant in the vent chamber located between the partition wall and the handle into the fuel tank filler neck whenever a vacuum extant in the fuel tank filler neck exceeds a preset limit to relieve any unwanted vacuum extant in the fuel tank filler neck.

34. The filler neck closure of claim 33, wherein the vacuum-relief valve includes a seal ring, a valve stem, and a vacuum spring configured to urge the valve stem relative to the partition wall normally against a valve seat provided on the partition wall to close the vacuum-relief aperture until a vacuum extant in the fuel tank filler neck exceeds the preset limit.

\* \* \* \* \*